(12) United States Patent
Lee et al.

(10) Patent No.: US 10,977,378 B2
(45) Date of Patent: Apr. 13, 2021

(54) ENCODING-LOCKED METHOD FOR AUDIO PROCESSING AND AUDIO PROCESSING SYSTEM

(71) Applicant: SILICON INTEGRATED SYSTEMS CORP., Hsinchu (TW)

(72) Inventors: Min-Han Lee, Hsinchu (TW); Sin-Kuo Cho, Hsinchu (TW)

(73) Assignee: SILICON INTEGRATED SYSTEMS CORP., Hsinchu (TW)

(\*) Notice: Subject to any disclaimer, the term of this patent is extended or adjusted under 35 U.S.C. 154(b) by 279 days.

(21) Appl. No.: 15/594,509

(22) Filed: May 12, 2017

(65) Prior Publication Data

US 2017/0329977 A1  Nov. 16, 2017

(30) Foreign Application Priority Data

May 13, 2016 (TW) .................................. 105114977

(51) Int. Cl.
| | |
|---|---|
| *G06F 21/60* | (2013.01) |
| *H04L 29/06* | (2006.01) |
| *G06F 21/72* | (2013.01) |
| *H04L 9/14* | (2006.01) |
| *G10L 25/84* | (2013.01) |
| *G11B 20/00* | (2006.01) |

(52) U.S. Cl.
CPC .......... *G06F 21/602* (2013.01); *G06F 21/606* (2013.01); *G06F 21/72* (2013.01); *H04L 9/14* (2013.01); *H04L 63/083* (2013.01); *H04L 63/0846* (2013.01); *H04L 65/602* (2013.01); *H04L 65/607* (2013.01); *G10L 25/84* (2013.01); *G11B 20/00188* (2013.01); *G11B 20/00891* (2013.01); *H04L 2209/12* (2013.01)

(58) Field of Classification Search
CPC ...................... H04L 63/0428; G11B 20/00891
See application file for complete search history.

(56) References Cited

U.S. PATENT DOCUMENTS

| | | | | |
|---|---|---|---|---|
| 4,379,947 A | * | 4/1983 | Warner | H04H 20/34 370/204 |
| 5,406,619 A | * | 4/1995 | Akhteruzzaman | G06Q 20/00 235/380 |
| 5,943,422 A | * | 8/1999 | Van Wie | H04L 63/0428 705/54 |
| 6,088,450 A | * | 7/2000 | Davis | H04W 12/0605 713/182 |
| 6,480,961 B2 | * | 11/2002 | Rajasekharan | H04N 21/6334 726/27 |
| 6,642,966 B1 | * | 11/2003 | Limaye | H04N 21/23892 348/460 |

(Continued)

*Primary Examiner* — Saleh Najjar
*Assistant Examiner* — Michael W Chao
(74) *Attorney, Agent, or Firm* — Maschoff Brennan

(57) ABSTRACT

An encoding-locked method for audio processing for audio receiving device includes the following steps: inserting a first encryption key into a first digital signal stream so as to obtain a second digital signal stream, checking whether there is the first encryption key in a received digital signal stream so as to determine whether the received digital signal stream is the second digital signal stream, and when the received digital signal stream is not the second digital signal stream, no processing the received digital signal stream.

8 Claims, 4 Drawing Sheets

(56) References Cited

U.S. PATENT DOCUMENTS

| | | | |
|---|---|---|---|
| 6,707,914 B1* | 3/2004 | Bell | H04L 9/12 380/265 |
| 7,035,410 B1* | 4/2006 | Aiello | H04L 9/0822 380/247 |
| 8,103,247 B2* | 1/2012 | Ananthanarayanan | H04W 12/04 455/410 |
| 8,151,108 B1* | 4/2012 | Vantalon | H04L 63/0823 380/285 |
| 8,711,837 B1* | 4/2014 | Sapp | H04W 4/50 370/351 |
| 9,438,417 B2* | 9/2016 | Merchan | H04L 9/0838 |
| 9,524,385 B1* | 12/2016 | McKinley | G06F 21/305 |
| 10,349,270 B2* | 7/2019 | Hawkins | H04W 8/18 |
| 10,461,944 B2* | 10/2019 | Wajs | G06F 21/121 |
| 10,530,571 B2* | 1/2020 | Moon | H04L 9/065 |
| 10,692,068 B2* | 6/2020 | Misek | G06Q 20/12 |
| 2002/0146237 A1* | 10/2002 | Safadi | H04N 5/765 386/259 |
| 2003/0016826 A1* | 1/2003 | Asano | G11B 20/00086 380/277 |
| 2003/0061493 A1* | 3/2003 | Angelo | H04M 1/68 713/189 |
| 2003/0065952 A1* | 4/2003 | Otsuka | H04W 12/003 726/4 |
| 2003/0149874 A1* | 8/2003 | Balfanz | H04L 63/0492 713/168 |
| 2003/0154073 A1* | 8/2003 | Ota | G10L 19/018 704/207 |
| 2004/0093372 A1* | 5/2004 | Chen | H04L 63/0823 709/203 |
| 2005/0123135 A1* | 6/2005 | Hunt | H04N 5/913 380/200 |
| 2005/0213725 A1* | 9/2005 | Rodman | H04L 12/66 379/202.01 |
| 2006/0053298 A1* | 3/2006 | Ingerman | G06F 21/34 713/182 |
| 2006/0270465 A1* | 11/2006 | Lee | H04M 1/7253 455/569.1 |
| 2008/0240444 A1* | 10/2008 | Shuster | H04L 9/0894 380/277 |
| 2010/0131767 A1* | 5/2010 | Rhoads | G06Q 20/1235 713/176 |
| 2011/0040966 A1* | 2/2011 | Bozionek | H04L 63/126 713/161 |
| 2012/0128154 A1* | 5/2012 | Ran | H04K 1/00 380/255 |
| 2015/0281956 A1* | 10/2015 | Fang | H04M 1/72519 455/411 |
| 2016/0043872 A1* | 2/2016 | Wajs | H04L 9/0816 713/168 |
| 2018/0329676 A1* | 11/2018 | Williams | G06F 3/165 |
| 2019/0034644 A1* | 1/2019 | Roth | G06F 21/6209 |
| 2019/0081919 A1* | 3/2019 | Liberty | H04L 51/22 |

\* cited by examiner

ENCODING-LOCKED METHOD FOR AUDIO PROCESSING AND AUDIO PROCESSING SYSTEM

RELATED APPLICATIONS

This application claims priority to Taiwan Application Serial Number 105114977, filed May 13, 2016, which is incorporated by reference herein in its entirety.

BACKGROUND

Technical Field

The invention is related to an encoding-locked method for audio processing and an audio receiving device.

Description of Related Art

Audio processing is used for enhancing the sound effect so as to provide high quality sound and convenience. This technique is widely applied in the fields such as communication, voice control and audio-video transmission. According to different circumstances or needs, the needed audio processing functionality varies. How to authorize necessary paid functionality of audio processing is a problem to be conquered.

When an audio processing device receives one or more audio signal streams, it may process each of the audio signal streams without identifying whether or not one audio signal stream is authorized to utilize specific audio processing functionality. For example, certain audio signal streams may need to be processed with specific authorized audio processing so as to provide required sound effect while other audio signal streams need not to be process due to the requirement of the user or other reasons. How to select certain audio signal streams to be process with authorized audio processing functionality is a problem to be conquered.

SUMMARY

In one embodiment, the audio receiving device has a sensor, a converter, and an encoder. The sensor is configured to convert an audio wave into a piece of analog electric signal. The converter is electrically connected to the sensor and configured to convert the piece of analog electric signal into a first digital signal stream. The encoder is electrically connected to the converter and configured to selectively insert a first encryption key into the first digital signal stream so as to generate a second digital signal stream.

In one embodiment, the encoding-locked method for audio processing includes the following steps: inserting a first encryption key into a first digital signal stream by a sending end so as to obtain a second digital signal stream, checking whether there is the first encryption key in a received digital signal stream by a receiving end so as to determine whether the received digital signal stream is the second digital signal stream, and not processing the received digital signal stream unless the received digital signal stream is the second digital signal stream.

BRIEF DESCRIPTION OF THE DRAWINGS

The disclosure can be more understood by reading the following detailed description of the embodiments, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
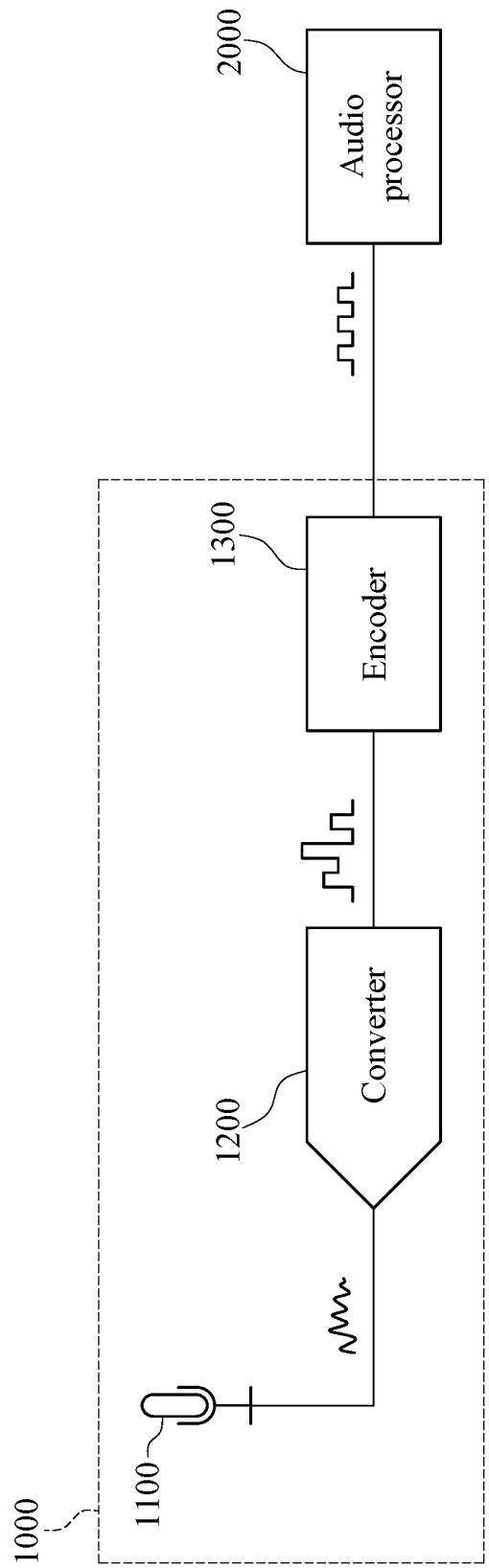
FIG. 1 is a functional block diagram of an audio receiving device in one embodiment of the present invention.

Please refer to FIG. 1, which is a functional block diagram of an audio receiving device according to one embodiment of the present invention. As shown in FIG. 1, the audio receiving device 1000 according to one embodiment of the present invention has a sensor 1100, a converter 1200, and an encoder 1300. The sensor 1100 is electrically connected to the converter 1200, and the converter 1200 is electrically connected to the encoder 1300. In certain embodiment, the converter 1200 and the encoder 1300 are integrated into one application-specific integrated circuit (ASIC). In the system, the encoder 1300 may be electrically connected to an external audio processor 2000.

The sensor 1100 is configured to convert the audio wave into a piece of analog electric signal. Specifically, the sensor 1100 is, for example but not limited to, a dynamic microphone, a condenser, a ribbon microphone, a carbon microphone, a piezoelectric microphone, a microelectromechanical system (MEMs) microphone, or other device capable of converting the audio wave into a piece of analog electromagnetic signal. The polar pattern of the sensor 1100 is, for example but not limited to, omnidirectional, unidirectional, bi-directional or other types of directional.

The converter 1200 is configured to convert the piece of analog electric signal into a first digital signal stream. Specifically, the converter 1200 is an analog-to-digital converter (ADC). For example, the converter 1200 is a flash ADC, a successive approximation ADC (SAR ADC), a delta-sigma ADC, a pipeline ADC, or other device capable of converting the analog electric signal into a piece of digital signal. In the fields related to the audio processing, the effective number of bits (ENOB) of the converter 1200 should be at least 16, or equivalently the signal to noise ratio (SNR) of the converter 1200 should be at least 100 dB. However, in other fields related to the audio processing, the performance of the converter 1200 is not necessarily meeting the aforementioned values.

Figure 2:
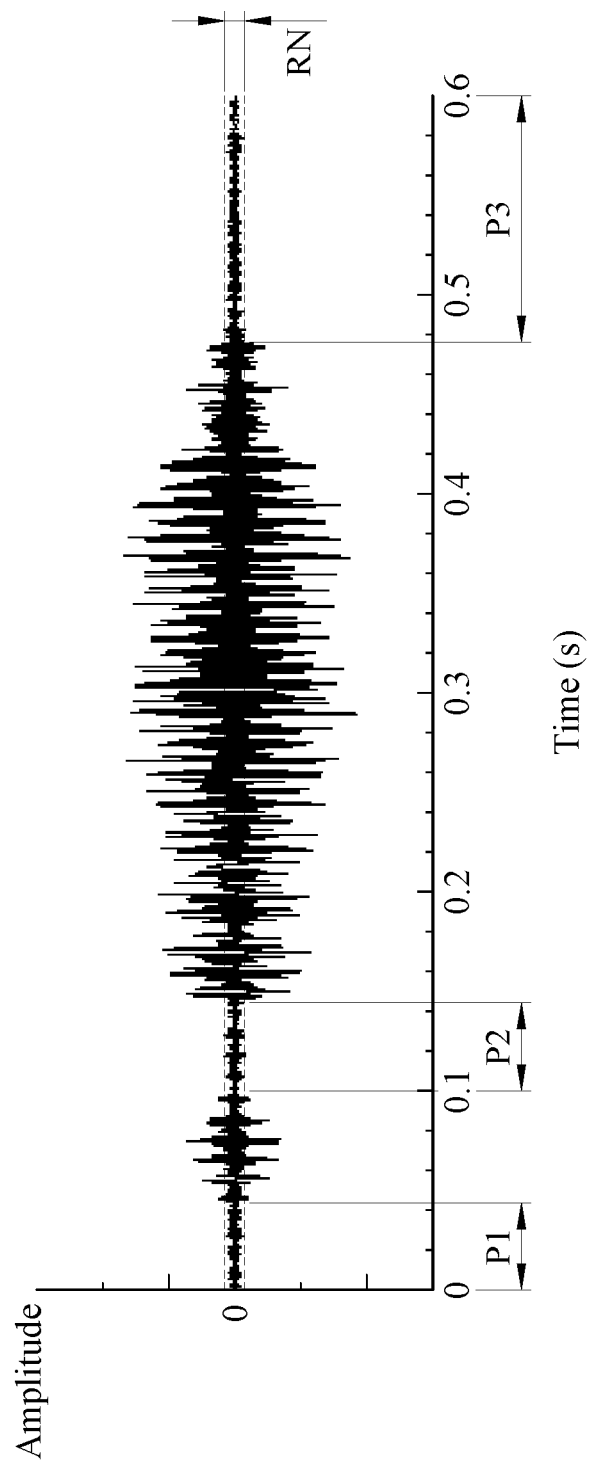
FIG. 2 is a timing diagram in one embodiment of the present invention.

In one embodiment, the encoder 1300 is configured to selectively insert a first encryption key into the first digital signal stream so as to generate a second digital signal stream. Specifically, please refer to FIG. 2, which is a timing diagram in one embodiment of the present invention. It should be noted that the timing diagram in FIG. 2 is not intending to limit the type or mode of the signal used/applied in the technique based on the present invention. As above, the first digital signal stream is a sequence of digital signals obtained from the sensor 1100 and the converter 1200, which is a piece of digital signals corresponding to the audio wave. The encoder 1300 inserts the first encryption key in a blank period of the first digital signal stream. For example, as shown in FIG. 2, the starting period P1 of the first digital signal stream corresponding to the audio wave usually contains non-effective data of audio wave such as noise. Hence, the data bits in the starting period P1 may be replaced with the data bits of the first encryption key. In other embodiment, because the first digital signal stream is a data stream related to the audio wave, and the audio wave is represented as wave packets. During the period between two adjacent wave packets, what is sensed by the sensor 1100 and converted by the converter 1200 is usually noise or surrounding sound which is useless. Specifically, during the period P2 and the period P2 in FIG. 2 the data bits of the first digital signal stream belong to the noise range RN or non-effective audio wave. Hence, the encoder 1300 determines that the period P2 and/or the period P3 is non-effective period, so the encoder 1300 replaces a segment of data in the period P2 or P3 with the data bits of the first encryption key. The first digital signal stream with first encryption key embedded is now the second digital signal stream.

The audio processor 2000 is electrically connected to the encoder 1300. In one embodiment, when the audio processor 2000 receives a piece of digital signal stream, the audio processor 2000 checks whether or not there is the first encryption key in the received digital signal stream because the audio processor 2000 may receive the second digital signal stream from the encoder 1300 or the digital signal stream from another source. When there is the first encryption key in the received digital signal stream, it means that the received digital signal stream is the aforementioned second digital signal stream, so the audio processor 2000 processes the second digital signal stream. When there is not the first encryption key in the received digital signal stream, it means that the received digital signal stream is not the second digital signal stream, so the audio processor 2000 would not process the received digital signal stream with the specific functionality. The audio processor 2000 is, for example but not limited to, a digital signal processor (DSP) executing an audio processing program, a central processing unit (CUP), or a device having specific functionality such as noise reduction, echo cancellation, surrounding sound effect, channel division, etc.

In one embodiment, when the received digital signal stream is the second digital signal stream, the audio processor 2000 returns a second encryption key to the encoder 1300. The encoder 1300 has a built-in look-up table (LUT), and the LUT describes the relationship between the second encryption key and the third encryption key. When the encoder 1300 receives the second encryption key, the encoder 1300 inserts the third encryption key corresponding to the received second encryption key into the first digital signal stream so as to obtain the third digital signal stream, and the audio processor processes the third digital signal stream based on the third encryption key. Specifically, please refer back to FIG. 2. The encoder 1300 replaces a segment of data bits in the starting period P1 of the first digital signal stream with the first encryption key to obtain the second digital signal stream and sends the second digital signal stream to the audio processor 2000. After the audio processor 2000 receives the second digital signal stream having the first encryption key therein, the audio processor 2000 sends the second encryption key to the encoder 1300. After the encoder 1300 receives the second encryption key, the encoder 1300 replaces a part of data bits in the period P2 of the first digital signal stream or a part of data bits in the period P3 of the first digital signal stream with the third encryption key corresponding to the second encryption key so as to obtain the third digital signal stream.

In another embodiment, the encoder 1300 does not embed the first encryption key into the starting period P1. In stead, when the audio processor 2000 receives the digital signal stream, the audio processor 2000 sends a second encryption key to the source of the digital signal stream. If the source of the digital signal stream is the encoder 1300, the encoder 1300 inserts the first encryption key corresponding to the second encryption key in the aforementioned starting period P1, the period P2, or the period P3 based on the second encryption key so as to obtain the second digital signal stream. Hence, the audio processor 2000 is capable of checking whether the successive received digital signal stream has the encryption key corresponding to the second encryption key. If the successive received digital signal stream has the encryption key corresponding to the second encryption key, it means that the received digital signal stream is the second digital signal stream from the audio receiving device 1000, and the audio processor 2000 then process the second digital signal stream.

In another embodiment, the encoder 1300 encrypts the first digital signal stream based on a second encryption key sent from the audio processor 2000 so as to obtain the second digital signal stream. For example, the encoder 1300 has a built-in look-up table (LUT) describing the relationships between the first encryption keys, the second encryption key and the encryption modes. The encryption mode is, for example, scrambling or other encryption methods. In one embodiment, the second digital signal stream may only have the encrypted first digital signal stream. The first encryption key is not embedded in the second digital signal stream but sent to the audio processor 2000 by another signal path. In another embodiment, the second digital signal stream has the first encryption key and the encrypted first digital signal stream therein.

When the audio processor 2000 receives the second digital signal stream, the audio processor 2000 decrypts the second digital signal stream based on the first encryption key embedded in the second digital signal stream, or based on the first encryption key received together with the second digital signal stream, so as to obtain the original first digital signal stream. The, the audio processor 2000 processes the first digital signal stream. In other embodiments, the first encryption key is generated and sent by the audio processor 2000 to the encoder 1300, so the second digital signal stream sent to the audio processor 2000 by the encoder 1300 has the information of the first encryption key embedded therein.

Figure 3:
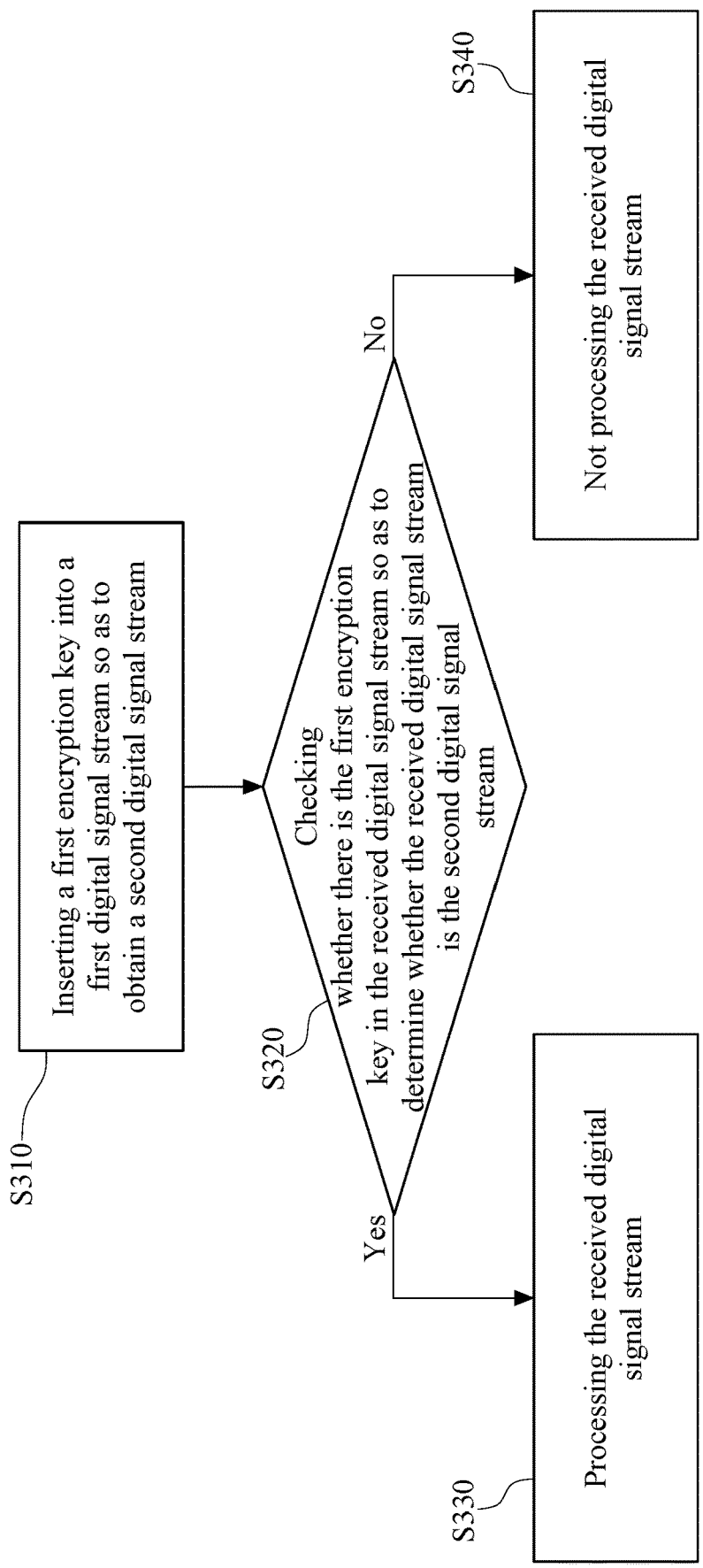
FIG. 3 is a flowchart of the encoding-locked method for audio processing in one embodiment of the present invention.

In other words, according to the audio receiving device and the mechanism in one or more embodiments in the present invention, an encoding-locked method for audio processing is disclosed in the present invention. The encoding-locked method allows the audio processor to process the locked audio signal stream to meet the desire of the user in different conditions or needs based on the authorization. Specifically, please refer to FIG. 3, which is a flowchart of the encoding-locked method for audio processing in one embodiment of the present invention. As shown in FIG. 3, in step S310, the encoder 1300 of the sending end inserts a first encryption key into a first digital signal stream so as to obtain a second digital signal stream. In step S320, when the receiving end receives the digital signal stream, the receiving end checks whether there is the first encryption key in the received digital signal stream so as to determine whether the received digital signal stream is the second digital signal stream. When the received digital signal stream is the second digital signal stream, as shown in step S330, the audio processor 2000 of the receiving end processes the received digital signal stream, which is the second digital signal stream. Otherwise, as shown in step S340, the audio processor 2000 of the receiving end does not process the received digital signal stream.

Figure 4:
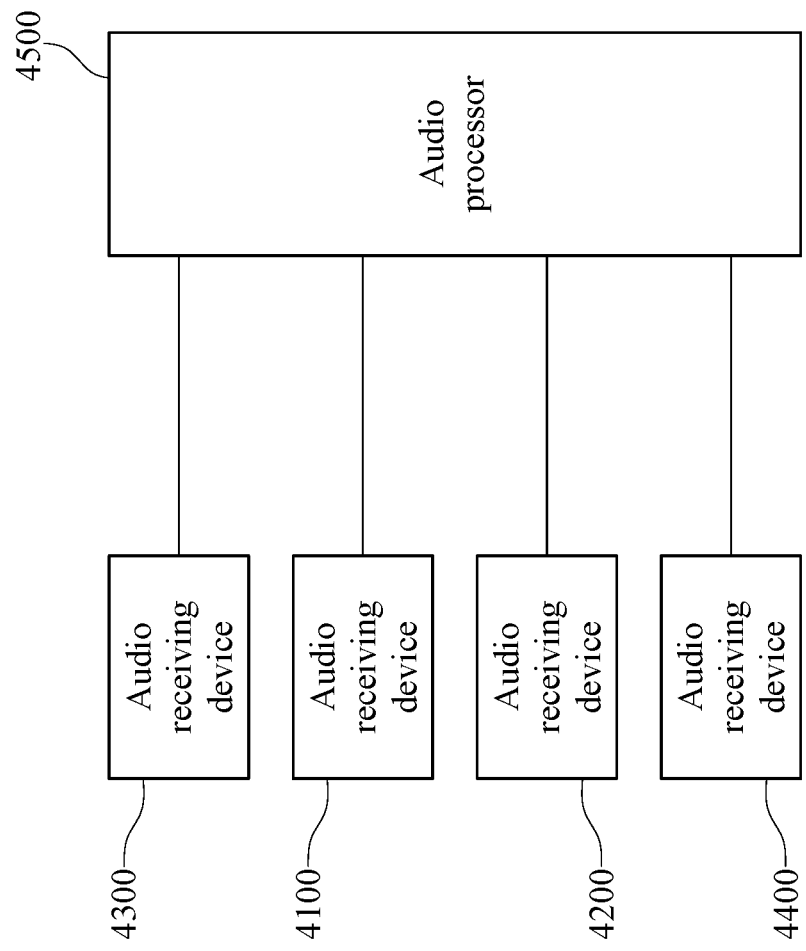
FIG. 4 is an architecture diagram of an audio processing system in one embodiment of the present invention.

Hence, please refer to FIG. 4, which is an architecture diagram of an audio processing system in one embodiment of the present invention. As shown in FIG. 4, the audio processing system in one embodiment of the present invention has four audio receiving devices 4100~4400 and an audio processor 4500. In one embodiment, because the audio receiving device 4100 and the audio receiving device 4200 are used for receiving the voice content in the interaction between persons, and the audio receiving device 4300 and the audio receiving device 4400 are used for receiving the surrounding sound, so the designer uses the audio receiving device 1000 in FIG. 1 as the audio receiving device 4100 and the audio receiving device 4200 in this embodiment, and the audio processor 2000 in FIG. 1 as the audio processor 4500 in this embodiment. According to the aforementioned embodiments, the audio processor 4500 only processes the digital signal streams from the audio receiving device 4100 and 4200 with the human voice recognition or noise cancellation functionalities. As to the digital signal streams from the audio receiving device 4300 and 4400, the audio processor 4500 does not process them.

In another embodiment, a designer takes the audio receiving device 1000 in FIG. 1 as the audio receiving devices 4100~4400, and takes the audio processor 2000 as the audio processor 4500 in this embodiment. Besides, the designer sets the original audio processing functionality so that the encoder in the audio receiving device 4100 and the encoder in the audio receiving device 4200 encodes the digital signal stream so as to enable the corresponding functionality of the audio processor 4500. The encoder in the audio receiving device 4300 and the encoder in the audio receiving device 4400 do not encode their digital signal streams. According to the aforementioned embodiments, because only the digital signal stream from the audio receiving device 4100 and the digital signal stream from the audio receiving device 4200 have the information of the encryption key therein, only the digital signal streams from that two audio receiving devices 4100 and 4200 are processed by the audio processor 4500. The digital signal stream from the audio receiving device 4300 and the digital signal stream from the audio receiving device 4400 are not processed by the audio processor 4500. However, it is possible to authorize and enable the encoding-locked functionality of the encoder in either the audio receiving device 4300 or the audio receiving device 4400 so as to enable the corresponding sound effect functionality of the audio processor 4500.

As above, by the encryption key or the encryption mechanism, the audio receiving device and the encoding-locked method for audio processing in the present invention allows the user to get the sound effect functionality according to his/her needs.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. An audio processing system, comprising:
   a sensor, configure to convert a piece of audio wave into a piece of analog electric signal;
   a converter electrically connected to the sensor, configured to convert the piece of analog electric signal into a first digital signal stream;
   an encoder electrically connected to the converter, configured to selectively encode the first digital signal stream based on a first encryption key so as to generate a second digital signal stream; and
   an audio processor electrically connected to the encoder, wherein the audio processor sends a second encryption key to the encoder, the encoder inserts the first encryption key corresponding to the second encryption key into the first digital signal stream so as to generate the second digital signal stream; when the audio processor receives another digital signal stream, the audio processor checks whether the received digital signal stream has an encryption key corresponding to the second encryption key, when the another digital signal stream has the encryption key corresponding to the second encryption key, the audio processor confirms the another digital signal stream is the second digital signal stream from the audio receiving device, and the audio processor then processes the second digital signal stream,
   wherein when the received digital signal stream is the second digital signal stream, the audio processor sends a second encryption key to the encoder, and when the encoder receives the second encryption key, the encoder further inserts a third encryption key corresponding to the second encryption key into the first digital signal stream so as to obtain a third digital signal stream, and the audio processor processes the third digital signal stream based on the third encryption key.

2. The audio processing system in claim 1, wherein the encoder inserts the first encryption key into a blank period of the first digital signal stream so as to generate the second digital signal stream.

3. The audio processing system in claim 2, wherein the blank period is selected from a group consisting of a starting period of the first digital signal stream, a noise period of the first digital signal stream, and a non-effective period of the first digital signal stream, and the noise period, wherein the blank period is selected from a group consisting of a starting period of the first digital signal stream, a noise period of the first digital signal stream, and a non-effective period of the first digital signal stream, and the noise period is a period in the first digital signal stream in which bit values belong to a noise range or the non-effective period.

4. The audio processing system in claim 1, wherein the encoder encrypts the first digital signal stream based on an encryption mode corresponding to the first encryption key so as to generate the second digital signal stream.

5. The audio processing system in claim 4, wherein when the audio processor receives the second digital signal stream, the audio processor decrypts the second digital signal stream based on the first encryption key so as to obtain the first digital signal stream and processes the first digital signal stream.

6. An encoding-locked method for audio processing, comprising:
   converting a piece of audio wave into a piece of analog electric signal by a sensor;

converting the piece of analog electric signal into a first digital signal stream by a converter;

sending a second encryption key to an encoder by an audio processor;

inserting a first encryption key corresponding to the second encryption key into the first digital signal stream so as to generate a second digital signal stream by the encoder;

by an audio processor, checking whether another digital signal stream has an encryption key corresponding to the second encryption key;

by the audio processor, confirming the another digital signal stream is the second digital signal stream when the another digital signal stream has the encryption key corresponding to the second encryption key; and by the audio processor, processing the second digital signal stream, wherein when the another digital signal stream is the second digital signal stream, the method further comprises:

sending a second encryption key to the encoder by the audio processor;

further inserting a third encryption key corresponding to the second encryption key into the first digital signal stream by the encoder so as to obtain a third digital signal stream; and processing the third digital signal stream based on the third encryption key by the audio processor.

7. The method in claim 6, wherein in inserting the first encryption key into the first digital signal stream, the first encryption key is inserted into a blank period of the first digital signal stream or a non-effective period of the first digital signal stream.

8. The method in claim 7, wherein the blank period or the non-effective period is selected from a group consisting of a starting period of the first digital signal stream and a noise period of the first digital signal stream, and the noise period is a period in the first digital signal stream in which bit values belong to a noise range or the non-effective period.

* * * * *